United States Patent
Lau et al.

(10) Patent No.: US 6,850,766 B2
(45) Date of Patent: Feb. 1, 2005

(54) VOICE ACTIVATED WIRELESS LOCATOR SERVICE

(75) Inventors: David Lau, Dallas, TX (US); Sharon Miesen, McKinney, TX (US); Justin Richmond, Dallas, TX (US)

(73) Assignee: Wirenix, Inc., Carrollton, TX (US)

( * ) Notice: Subject to any disclaimer, the term of this patent is extended or adjusted under 35 U.S.C. 154(b) by 593 days.

(21) Appl. No.: 09/841,849

(22) Filed: Apr. 25, 2001

(65) Prior Publication Data

US 2002/0168986 A1 Nov. 14, 2002

Related U.S. Application Data

(60) Provisional application No. 60/199,792, filed on Apr. 26, 1999, and provisional application No. 60/199,775, filed on Apr. 26, 1999.

(51) Int. Cl.$^7$ .............................. H04Q 7/20; H04Q 7/32
(52) U.S. Cl. .................. 455/456.1; 455/456.2; 455/456.3; 455/457; 455/550.1; 455/563; 455/414.1; 455/414.2; 342/357.09; 342/357.1
(58) Field of Search .................. 455/456.1, 456.2, 455/456.3, 456.4, 456.5, 456.6, 457, 403, 422.1, 404.1, 404.2, 414.1, 414.2, 414.3, 414.4, 552.1, 550.1, 563, 569.2; 342/357.01, 357.06, 357.08, 357.09, 357.1; 701/200, 201, 207, 208, 211, 213

(56) References Cited

U.S. PATENT DOCUMENTS

| | | | | |
|---|---|---|---|---|
| 5,930,699 A | * | 7/1999 | Bhatia | 455/456.3 |
| 6,157,705 A | * | 12/2000 | Perrone | 379/88.01 |
| 6,317,684 B1 | * | 11/2001 | Roeseler et al. | 701/202 |
| 6,356,529 B1 | * | 3/2002 | Zarom | 370/231 |
| 6,615,130 B2 | * | 9/2003 | Myr | 701/117 |
| 2002/0128021 A1 | * | 9/2002 | Kikinis et al. | 455/456 |
| 2003/0060211 A1 | * | 3/2003 | Chern et al. | 455/456 |

* cited by examiner

Primary Examiner—William Trost
Assistant Examiner—Keith Ferguson
(74) Attorney, Agent, or Firm—Slater & Matsil, L.L.P.

(57) ABSTRACT

A voice activated wireless locator service provides an interactive voice response system whereby a user is walked through a sequence of voice prompts to select a desired destination. Using either geo-coded information provided during the voice call or speech recognition of a shortcut phrase associated in a database with a street address, and using a locator service database, the system can provide spoken instructions using a text to speech engine, providing the name, location, and driving directions to one or more destinations matching the criteria provided by the user. Because the system uses speech recognition technology, it is particularly well suited for wireless access devices, such as cellular telephones, which are often used when a user is engaged in other activities, such as driving. Once the location information and driving directions are retrieved and provided vocally to the user, the same information can be provided in a text format using a WAP data connection and a database access synchronized to the voice activated database entries.

10 Claims, 4 Drawing Sheets

VOICE ACTIVATED WIRELESS LOCATOR SERVICE

This Application claims benefit of U.S. Provisional Application No. 60/199,792 filed on Apr. 26, 1999. This Application is related to commonly assigned U.S. Provisional Patent Application No. 60/199,775 filed Apr. 26, 1999 and entitled Voice Activated Wireless Navigation of a Computer Network, and to co-pending, commonly assigned U.S. patent application Ser. No. 09/841,848, filed concurrently herewith and entitled Voice Activated Wireless Navigation of a Computer Network, which patent applications are hereby incorporated by reference.

FIELD OF THE INVENTION

The invention relates generally to wireless access to a locator service and more specifically to a voice activated wireless system for locating desired destinations, such as restaurants, shopping, and the like.

BACKGROUND OF THE INVENTION

Two of the most rapidly growing and developing areas of technology today are wireless communications and the Internet. Not surprisingly, these two technologies are experiencing a rapid convergence, much as wire-based telephony and personal computers converged in the 1990's and continue to do so today.

One of the primary motivating factors behind the convergence of wireless telephony and Internet technology is the ubiquitous presence of the World Wide Web in all facets of society. E-mail, e-commerce, entertainment, business-to-business commerce, and many other resources are commonly available as World Wide Web resources. Not surprisingly, consumers desire to have such resources be as convenient and mobile as today's hand-held devices, such as cellular telephones and personal digital assistants (PDA's). Because the Internet and World Wide Web developed based upon wire-based telephony and relatively powerful computers, several technological hurdles must be overcome before the World Wide Web can be accessed from a wireless device with sufficient ease and convenience to make the Web a truly wireless resource.

One service provided by the World Wide Web that is rapidly growing in usage and popularity is so-called locator services. A locator service functions essentially as an electronic yellow pages. A user can identify a particular type of destination, such as a restaurant, type of store, or public park, and the locator service will identify the name and address of destinations in the vicinity that match the user's criteria. In order to use the locator service, however, the user must know the service's web address or URI.

One shortcoming in a typical current wireless access device is the limited means for inputting data, such as the uniform resource identifier (URI) of a desired Web resource. Whereas the typical Web user uses a personal computer (PC) with a mouse and keyboard for inputting information, a wireless access device user generally must rely upon a cumbersome and tedious process of inputting a URI one letter at a time using the limited keypad capabilities of a typical cellular telephone or PDA. This is because cell phone and PDA's were developed to provide other functions, and were not originally intended for the type of data input intensive operations Web browsing often entails.

The shortcomings of wireless access devices are exacerbated by the fact that such devices are typically used when the end-user is outside of his or her home, oftentimes engaged in other activities such as walking or driving. Under those circumstances, it is most undesirable that the user be distracted from the primary task (such as driving) in order to tediously input a request for location services one letter at a time.

Therefore, a need exists for a system and method whereby World Wide Web resources, as well as other resources available over the Internet or some other computer network, can be easily accessed using the functionality provided in a typical wireless access device.

Another shortcoming in the prior art is that most locator services available on the World Wide Web were designed for stationary users, such as consumers located at a stationary desktop workstation. These systems fail to recognize that the location of a mobile user (such as a user on a mobile cellular telephone) can be an important factor in identifying or selecting from among several destinations (such as restaurants) that would be of interest/benefit to the user. Therefore, a need exists in the art for a system that not only allows for easy and convenient inputting of information to a locator service, but also one that provides a flexible response based at least in part on the user's current location.

SUMMARY OF THE INVENTION

In one aspect the present invention provides for a voice activated wireless locator service comprising a wireless access device, a speech server configured to receive incoming voice calls from the wireless access device and including a call manager, a speech recognition engine, a text to speech engine, and a locator service accessible to the speech server, receiving from the speech server a type of destination and a location of the wireless access device, and returning to the speech server location information relating to at least one destination matching the type of destination received as input. The system further includes a WAP server configured to receive request from the wireless access device and to retrieve the location information relating to the at least one destination matching the type of destination received as input, and to display said location information on the wireless access device.

In another aspect, the invention provides for a method of providing voice activated locator services to a user using a wireless access device. The method includes initiating a voice connection between the wireless access device and a speech server, initiating a call flow in which voice prompts are provided to the user and the user's spoken responses are received, and converting the user's spoken responses into database query commands. The method further includes forwarding the database query commands to a locator service, along with location information for the wireless access device, receiving destination information from the locator service, converting the destination information into a voice prompt and presenting same to the user over the voice connection, and converting the destination information into a graphical representation and presenting the same to the user over a data connection between the wireless access device and a WAP server.

In yet another aspect, the invention provides for a method of providing a user of a wireless access device with voice driven access for specifying the starting location used to provide subsequent locator services without reference to the actual physical location of the wireless device. The method includes initiating a voice connection between the wireless access device and a speech server, initiating a call flow in which voice prompts are provided to the user, and receiving as input both a spoken request for locator services and a spoken shortcut phrase. The method further includes comparing the shortcut phrase to entries stored in a street address database and determining the street address associated with the shortcut phrase, as well as converting the user's spoken responses into database query commands. The method further includes forwarding the database query commands and the starting street address to a locator service, receiving destination information from the locator service, converting the destination information into a voice prompt and presenting same to the user over the voice connection, and converting the destination information into a graphical representation and presenting the same to the user over a data connection between the wireless access device and a WAP server.

DETAILED DESCRIPTION OF THE PREFERRED EMBODIMENTS

Figure 1:
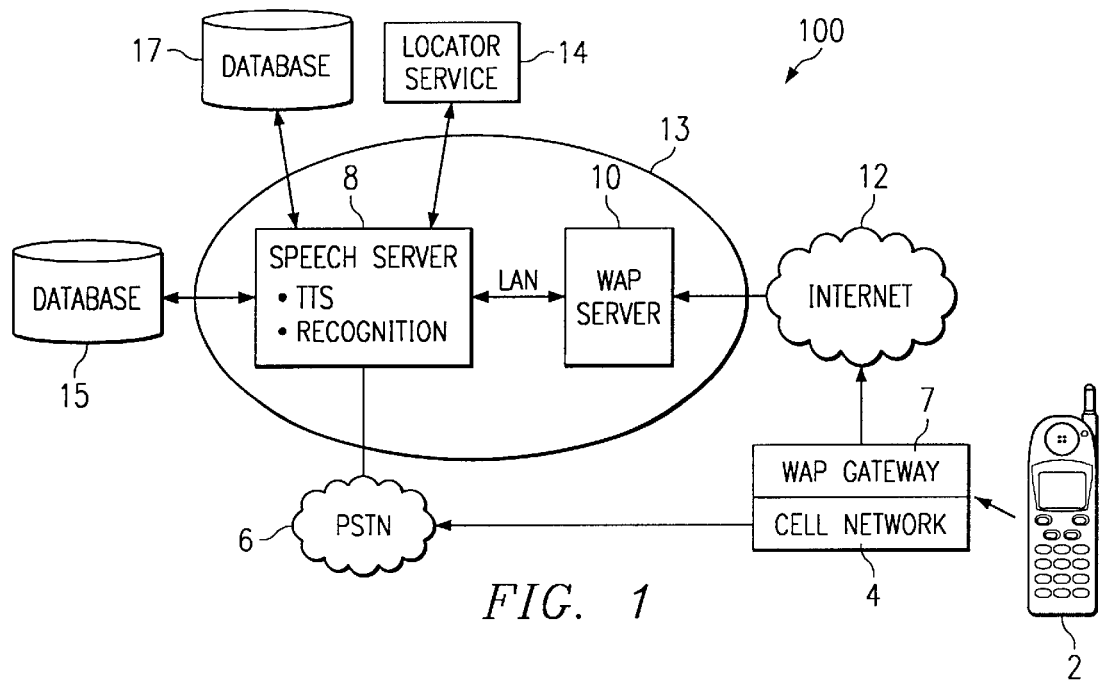
FIG. 1 illustrates in block diagram format, the hardware components of a preferred embodiment system for providing voice activated wireless locator services.

A first preferred embodiment system and method will be described with reference to FIGS. 1 and 2, with FIG. 1 being illustrative of various hardware components of the system and FIG. 2 being illustrative of the software components. The system, referred to generally as 100, includes a wireless access device 2, which is preferably a Wireless Access Protocol (WAP) compatible cellular telephone handset, such as the Motorola iDEN "plus" WAP phone available from Motorola Corp., Schaumburg, Ill. Cellular phone 2 runs a WAP compatible browser, specially configured for the limited memory and storage capabilities of a cellular phone, such as the UP Browser available from OpenWave Systems, Inc. of Redwood City, Calif. Alternatively, wireless access device 2 could be a personal digital assistant (PDA), such as a Palm Pilot VII, available from Palm Computing, configured to include a WAP Web browser and cellular or wireless communication capabilities. For clarity, wireless access device 2 may be referred to as a cellular phone in the following description, even though other embodiment devices, such as PDA's are also contemplated.

As illustrated, wireless access device 2 is preferably configured to transmit either "data" or "voice." In practice, both "data" and "voice" are transmitted as analog or digital signals using similar radio frequency modulation and communication schemes. The difference between data and voice is the protocol used in handling the received signal at the receiving end. "Data" communications will be de-modulated and treated as digital information, whereas "voice" communications will be de-modulated, then passed to a digital-to-analog converter (DCA) to re-create a voice signal.

Voice communications are transmitted over a cellular service provider network 4 to the public switched telephone network (PSTN) 6 and thence to the desired destination (as indicated by the telephone number dialed). In the illustrated case, the desired destination is a speech server 8, for which additional details will be provided below.

Data communications will also be transmitted from wireless access device 2 through cellular service provider network 4 and then to a WAP gateway 7, which serves as a sort of translator and border crossing between the wireless communications network 4 and the Internet 12. WAP gateway 7 accepts incoming requests in WAP protocol and forwards those requests onto the Internet using TCP/IP protocols. Likewise, TCP/IP protocol requests originating on the Internet will be translated to WAP protocol by WAP gateway before being passed on to cellular service network 4. Once translated to TCP/IP network protocols, the requests from wireless access device 2 can be transmitted over the Internet 12 to a specified destination, such as WAP server 10.

In the preferred embodiments, WAP/Web server 10 (sometimes described herein as a Web server 10 and sometimes referred herein as a WAP server 10, depending upon the functionality being provided at that time), provides standard Web server functionality, such as receiving incoming requests for resources and serving up Web pages or other Web resources in response. When the request originates from a WAP-compliant browser on a wireless access device, pages and resources designed for the limited graphics capabilities of wireless access devices are served up. When the request originates from a full-featured browser, pages and resources designed for the full graphics capabilities of that browser are served up. A preferred example of such a server is Microsoft IIS, available from Microsoft Corp., Redmond, Wash. The server can run on a x86 based platform, such as a Dell Pentium based Server, available from Dell Computer Corp., Austin, Tex.

WAP Server 10 may obtain additional resources and services from speech server 8. In the preferred embodiments, speech server 8 is a compact PCI chassis housing appropriate cards and Unix based processors for line interface 20, a call manager 22, a speech recognition engine 24, and a Local Area Network (LAN) 26. Connected to speech server 8 is a location database 15 and locator service 114. Location database 15 is preferably a SQL compliant relational database configured to handle the demands of the particular system to which it is attached. The database can be located locally to speech server 8 or may be located on another computer, as illustrated, and connected by a LAN or similar network connection of sufficient speed and bandwidth. As will be described in more detail below, location database 15 contains geo-coded location information for destinations of interest to a user. In the preferred embodiments, destinations such as stores and restaurants will be described; the teachings apply equally to other destinations, however, such as residences, parks, places of interest, hospitals, schools, public meeting places, government offices, and the like. Also connected to speech server 8 is a street address database 17.

Street address database 17 is preferably a SQL compliant relational database configured to handle the demands of the particular system to which it is attached. The database can be located locally to speech server 8 or may be located on another computer, as illustrated, and connected by a LAN or similar network connection of sufficient speed and bandwidth. As will be described in more detail below, street address database 17 contains shortcut phrases associated with geo-coded locations of interest to a user.

Locator service 114 is shown connected to speech server 8 by way of LAN 13. Alternatively, and preferably, locator service 114 is connected to speech server 8 by way of an Internet connection, using well known TCP/IP protocols or other network protocols.

Figure 2:
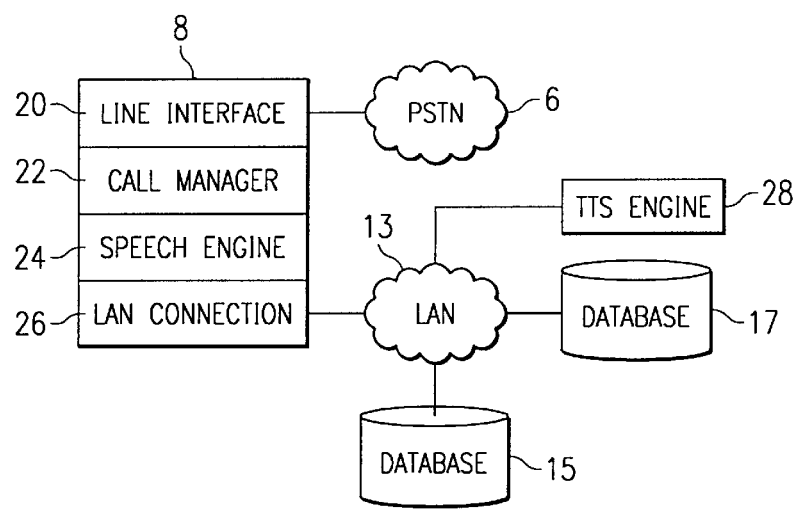
FIG. 2 illustrates in greater detail a speech server for use in a preferred embodiment system.

Further details will now be provided regarding speech server 8 with reference to FIG. 2. As shown, speech server 8 includes a line interface 20, a call manager 22, a speech recognition engine 24, and a Local Area Network (LAN) connection 26. Speech server 8 is preferably an x86 based workstation, such as a Pentium based personal computer.

Line interface 20 provides interface between speech server 8 and the public switched telephone network 6. An exemplary line interface card is the D/41 available from Dialogic Corp., which provides four ports for incoming calls. In commercial embodiments, greater call handling capacity would be preferable.

Call manager 22 operates as a manager and arbitrator of resources for incoming calls and outgoing responses, as will be described in greater detail below. Speech recognition engine 24 is preferably a Nuance 6.2.2 speech recognition engine, available from Nuance Communications Menlo Park, Calif. Finally, LAN connection 26 provides interface between speech server 8 and other components also connected to a LAN 13 (FIG. 1), such as WAP server 10 and also text to speech ("TTS") 28. TTS engine 28 is preferably a Fonix FAAST 4.0 TTS product, or Lernout & Hauspie, Inc. "RealSpeak" TTS product, or similar TTS program. In other embodiments, TTS engine 28 can run on the same computer and be considered as part of speech server 8. Preferably, however, the TTS engine runs on a separate computer in order to provide for quicker response times and to mitigate the effects of competition for computer resources.

Figure 3:
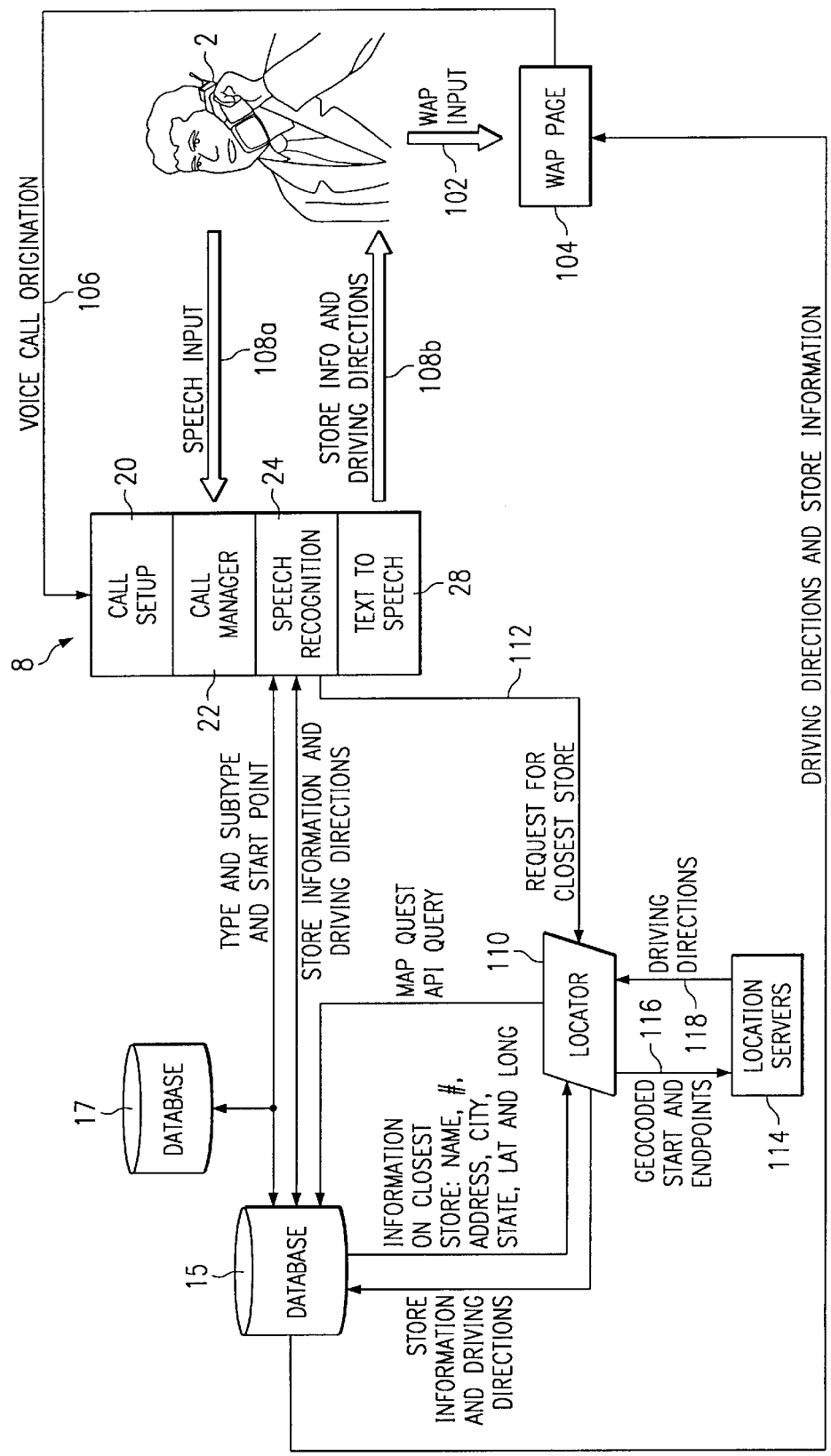
FIG. 3 illustrates in block diagram format, the software components of a preferred embodiment system for providing voice activated wireless locator services.

Operation of system 100 will be described with reference to FIG. 3, which illustrates the software components of system 100 and their interaction. Operation begins with a user placing a WAP data call to WAP server 10 (FIG. 1) using wireless access device 2. This is illustrated schematically in FIG. 3 by arrow 102 between wireless access device 2 and WAP Page 104. WAP page 104 is served up by WAP server 10 when a data connection is first initiated by a user. Included on WAP page 104 is a hyper-link or similar resource that will cause initiation of a voice call between wireless access device 2 and speech server 8. When the link is selected by the user, the Web browser in wireless access device 2 will make system calls to the device's operating system to originate the voice call, as indicated by arrow 106. At this time, data connection 102 between wireless access device 2 and WAP server 10 will be suspended, but will not be terminated. In other embodiments, the end-user initiates access to speech server 8 by dialing the speech server's telephone number using wireless access device 2. The telephone number can be input manually using the device's numeric keypad, or may be stored in the device's memory and selected from a menu or list. Alternatively, the user might select an icon from a graphical user interface provided on the device 2, which icon has associated with it the telephone number for speech server 8.

Call setup firmware 108 represents firmware residing on the line interface card 20 of speech server 8 (FIG. 2). Once the call is established, call manager 22 initiates a call flow. A call flow is which is a sequence of voice prompts (either pre-recorded or generated by TTS engine 28), received responses (which are recognized by speech recognition engine 24) and calls to other resources, such as calls to databases 15 and 17. Voice prompts are provided to the end user and answers are received as indicated by arrows 108a and 108b.

Figure 4A:
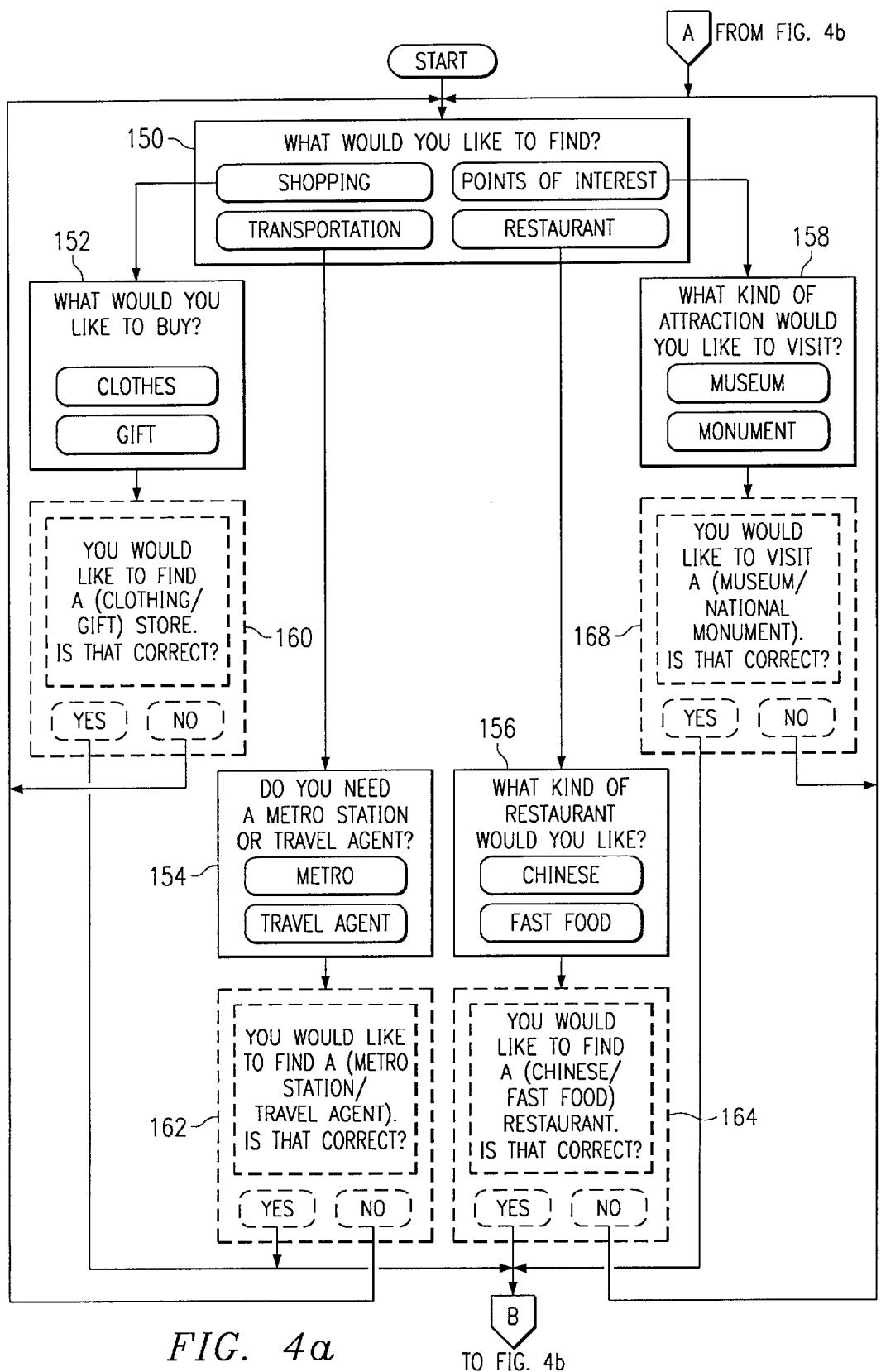
FIGS. 4a and 4b illustrates steps in the operation of the preferred embodiment system.
Figure 4B:
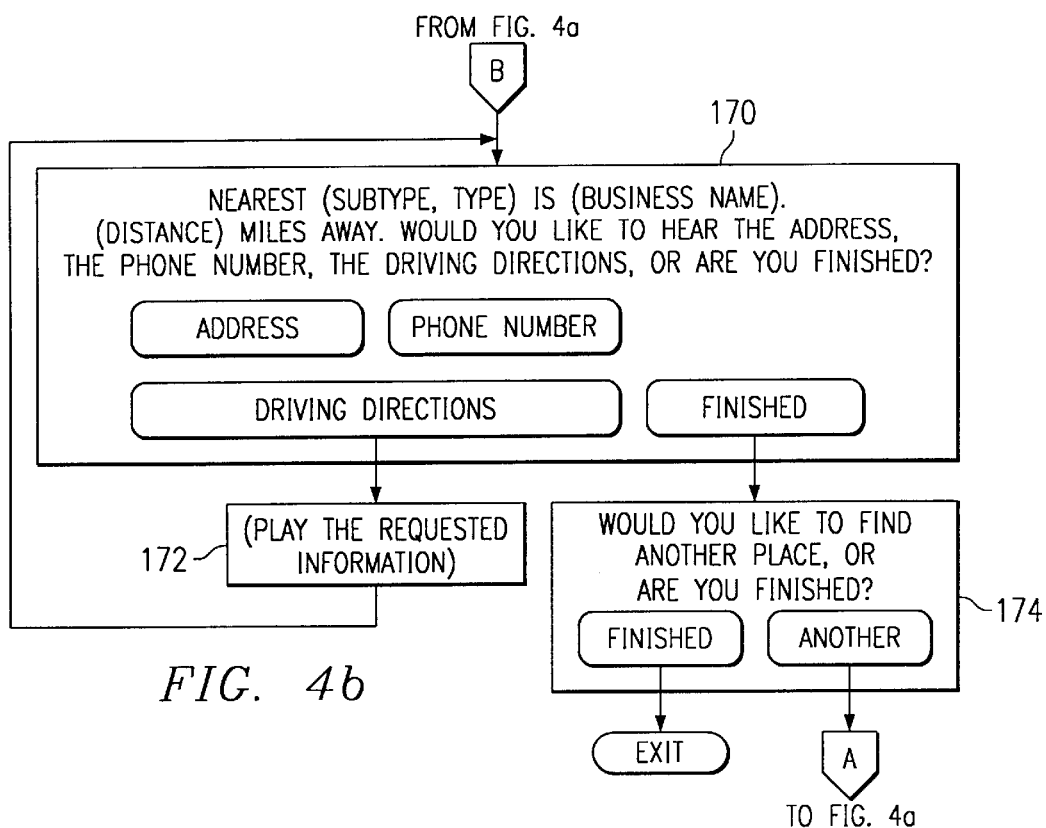

An example of the initial portion of a call flow is provided in FIGS. 4a and 4b. The call flow begins at step 150 where a voice prompt is provided to the end user. This voice prompt can be either a pre-recorded message that is accessed and served up by call manager 22 or, for greater flexibility, the prompt could be a text message that is converted to speech through calls to TTS engine 28. As shown, the voice prompt at 150 requests information as to what destination the user seeks. As illustrated, four possible spoken responses will be considered valid when received and translated by speech recognition engine 24. These four valid responses are "shopping," "transportation," "points of interest" and "restaurant." Optionally, the voice prompt can list the four destination types that are available as valid responses. These are provided for example only. Numerous other destinations can be accommodated as well.

The user responds to the prompt by answering with his or her destination type. The response is passed by call manager 22 to speech recognition engine 24 where the response is converted into a text-like format and compared to the grammar of acceptable responses. Depending upon the user's response, the call flow will proceed to either step 152, 154, 156, or 158. Although not illustrated for clarity, also contemplated in the preferred embodiments is a branch for error handling in the event the user's response is not recognized by speech recognition engine 24 or is recognized, but is an invalid response. Under those circumstances, the call flow could loop back to step 150 for a pre-set number of times, or could transfer the call to a human operator for further assistance. Other error handling routines, such as requesting responses in DTMF keypad format could also be employed.

Once the user has indicated the type of desired destination, a specific sub-type is requested in one of steps 152, 154, 156, or 158 (depending on the type of destination identified in step 150). Using step 152 as an example, which will be reached if the user identified shopping in response to the prompt at step 150, call manager 22 then provides the voice prompt "what would you like to buy?"The prompt could optionally also list out specific sub-types that are available, such as "clothes," "gifts," and the like. Again, the user's response is received, forwarded to speech recognition engine 24, and compared to a list of valid responses to determine the desired subtype of destination. Error handling routines as described above may be employed if a valid response is not received.

Optionally, the call flow may progress to a confirmation prompt, such as provided in step 160. This step requires TTS engine 28 in addition to pre-recorded voice prompts because this prompt will insert the type and subtype of destination that has been determined in steps 150 and 152, respectively (or 150 and 154, 150 and 156, or 150 and 158). One skilled in the art will readily recognize how to insert the type and sub-type generated by TTS engine 28 into the appropriate locations of a pre-recorded prompt, or alternatively the entire prompt at steps 160, 162, 164, and 166 may be TTS generated. If the user responds in the negative to the confirmation prompt, the call flow proceeds back to step 150 to give the user another opportunity to identify the type and subtype of desired destination. Alternatively, an error handling routine can be called in response to the negative response.

Referring again to FIG. 3, call manager 22 next sends a Common Object Module (COM) call to locator 110, as indicated by communication arrow 112. The COM call provides the desired type and subtype of destination to locator 110. Locator 110 is preferably a specialized program or function call that coordinates between the databases, locator services, and speech server, as described herein. The locator 110 queries database 15 for all entries having a matching type and subtype and retrieves for those entries the name, street address, and geo-coded location data (such as latitude and longitude information).

In order to determine which of the matching destinations is closest, locator 110 than forwards to the geo-coded information for each of the destinations to a locator service 114, as indicated by communication arrow 116. This request is preferably sent across an Internet connection, as the locator service 114 is typically a third party vendor of locator services, such as MapQuest.

Assuming the desired destination is Chinese restaurants, then the two, or three, or however many entries in database 15 that match the type "restaurant" and the subtype "Chinese" will be retrieved by locator 110, along with the name, address and geo-coded data for those restaurants. The geo-coded data for each restaurant is forwarded to the locator service 114, as described above, in order to determine which restaurant is closest.

The invention provides for the user to select how to indicate the starting location, i.e., the current actual location of the user to be provided to the locator service in order to determine which destination is closest. The call flow will play a prompt presenting the option of using the actual location of wireless access device 2 (which can be determined from cell network 4 using known signal triangulation techniques or alternatively from geo-coded information provided by the wireless access device itself). Alternatively, the user can identify his or her location using one of several previously stored starting locations or QuickPlaces™ as explained in detail below. The user makes the selection by speaking the desired shortcut phrase, or by requesting to use the actual location.

If the user selected to use the actual location, the geo-coded information for the actual location of wireless access device 2 is provided to the locator service. In some embodiments, the latitude and longitude or other geo-coded data for the wireless access device can be provided by incorporating a global satellite positioning system (not shown) in the device itself. A more preferred embodiment is to employ cellular site triangulation in the cellular service network itself, whereby the geo-coded data for each wireless access device is passed on to speech server 8 (or any other termination point of a call originating at the wireless device) as part of the call and communication services provided by the wireless service provider. Details regarding the triangulation process are not necessary for an understanding of the invention and have hence been omitted for clarity.

The following paragraphs describe how the concept of speech shortcuts can be applied to selecting a starting street address using voice recognition of a speech shortcut to identify and select the desired street address. The combination of a speech shortcut and a street address is known as a QuickPlace.™

Initially, the QuickPlaces must be created and stored for future reference. Returning to FIG. 2, street address database 17 is shown connected to speech server 8 by way of LAN 13. Database 17 is preferably a SQL compliant relational database, as is well known in the art, although any appropriately configured database is sufficient. QuickPlaces are stored to street address database 17 in several ways. The simplest manner of storing QuickPlaces would be for a PC user to access a Web page served up by Web server 10, which Web page provides text fields whereby a user can input a street address and an associated short cut phrase. In the preferred embodiment, each user of the system has an individual account. The QuickPlaces created by a user will be stored in a particular table in street address database 17 associated with that user. In other embodiments, the street address may be converted to a geocoded latitude and longitude and stored in database 17. In addition to creating new QuickPlaces, QuickPlaces can be edited, deleted, or renamed via Web server 10.

Another way to input QuickPlaces is to dial into speech server 8 directly over the public switched telephone network 6 or in the case of a cellular phone, over the cellular service network 4 and public switched telephone network 6. As discussed in greater detail below, speech server 8 will recognize an incoming call and will provide a series of voice prompts to allow a user to select what services are desired. Among the services included are options to add, edit, or delete QuickPlaces for the user's account. The user can input an address and an associated shortcut phrase vocally. The spoken address and shortcut will then be converted to text using speech recognition engine 24. Finally, the QuickPlaces service can also be accessed by dialing into speech server 8 using a wireless access device 2, via cellular service network 4, WAP gateway 7, and connecting via the Internet. Quick-Places could then be input using the data input capabilities of the cellular phone.

If the user spoke a QuickPlace™ shortcut phrase, the spoken phrase is passed to speech recognition engine 24 where it is converted to a text phrase and compared to the recognizable text phrases in the user's grammar (the grammar is a file of expected words that the speech recognition engine will accept as valid words). If the phrase is not found in the grammar, an error will be generated that preferably results in a prompt requesting the user to repeat the shortcut. If the phrase is found as valid, speech recognition engine 24 returns a look-up value to call manager 22. This look-up value is used by call manager 22 to identify the appropriate entry in street address database 17 associated with the QuickPlace™ shortcut phrase provided by the user. The geo-coded information for the address thus identified is provided to the locator service 114.

The locator service 114 returns to locator 110 the driving distance and driving directions for each of the Chinese restaurants in database 15, as indicated by communication arrow 118. Preferably, the information is returned in an ordered sequence, such as in order of the closest restaurants being returned first. In other embodiments, the locations service returns only the driving distance to locator 110. Locator 110 selects a particular destination, such as the closest Chinese restaurant, and then sends a second call to retrieve driving directions for only the destination. In this way, network traffic can be reduced.

Driving directions are then stored by locator 110 to database 115 for future use. At this point, the call flow continues as indicated by step 170 of FIG. 4b. A voice prompt including TTS generated phrases or a combination of pre-recorded voice prompts and appropriately inserted TTS generated phrases are presented to the user over the voice call, as shown. The nearest matching destination, such as the name of the nearest Chinese restaurant, is provided to the user along with a prompt to indicate whether the user desires more information, such as address, telephone number, or driving directions. Alternatively, the user may be simply satisfied having the name of the restaurant and so indicate by stating "finished," or a similar phrase. Assuming the user indicates a desire for additional information, that information will be provided from database 15 using TTS engine 28 as indicated by step 172. Also shown is step 174 in which the user is provided a voice prompt to select to find another destination or to terminate the call flow.

In a more preferred embodiment, database 15 is maintained and controlled by locator service 114 and includes name, address, and geo-coded information for most desired destinations, categorized by type and subtype. In that case, locator 110 would simply send the type and subtype information to locator service 114, which would return the driving distance and driving information for each matching destination stored on its own database 15. This allows the information to be retrieved with only a single call to locator service 114. Locator 110 could be configured to select the most desirable location based upon some pre-defined criteria such as driving distance, to pass back to speech server 8.

Another advantageous feature of the preferred embodiments is the capability to provide the destination information to the user in a graphical format using a WAP data connection, in addition to the oral instructions provided over the WAP voice call. This feature is described with reference to FIG. 5.

Figure 5:
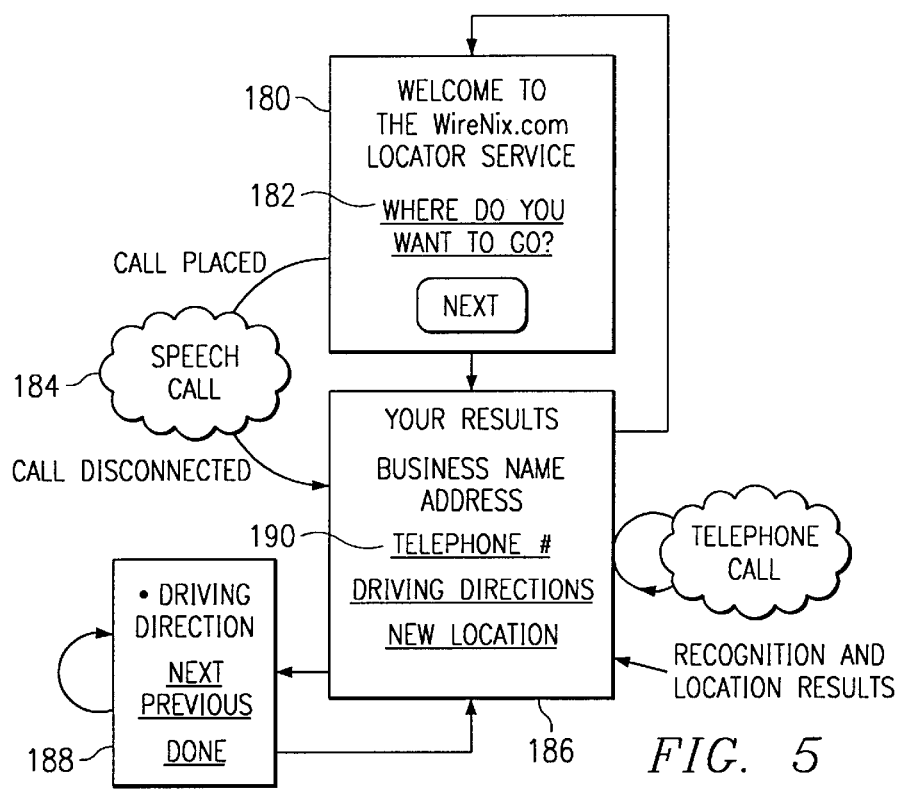
FIG. 5 illustrates schematically the operation of an exemplary preferred embodiment call flow process.

In FIG. 5, an exemplary graphical display 180 is shown. This display is accessed by the user by dialing into the WAP server 10 and will be displayed on the display portion of wireless access device 2. WAP server 10 serves up a WAP web page, or card, such as 180, which is generated using Wireless Mark-up Language (WML) and transferred to wireless access device 2 using WAP protocols, as described above. Included on page 180 is a hyper-link to speech server 8 (using HTTP or other well known link protocols). When selected, this link initiates a WAP voice call to speech server 8, as described above and as indicated schematically by "speech call" 184. Speech call 184 includes a call flow as described above with reference to FIGS. 4a and 4b. As described, information about a particular type of destination (Chinese restaurant, gift store, or the like) is provided vocally to the user during the speech call 184. Upon termination of the call flow, the WAP data connection between the wireless access device and WAP server 10 is resumed. At this point, WAP server 10 serves up a second page 186. This page includes the business name and address, as well as links such as "telephone number," and "driving directions." Taking the driving directions link for example, the user can get a text description of the driving directions provided during speech call 184 (if requested) simply by selecting that link. When the link is selected, WAP server 10 accesses the information stored on database 15 and serves the information up as either text or graphics, as indicated by page 188. One skilled in the art will recognize that WAP server 10 must have a way of synchronizing the information provided to the wireless device with the information that was provided during the call flow. This can be easily accommodated by a socket call from speech server 8 to WAP server 10 providing UserID and SessionID information, as discussed in related co-pending provisional application 60/199,775, filed Apr. 26, 2000 and entitled Voice Activated Wireless Navigation of a Computer Networks. Likewise, database 15 can index the driving directions and other destination information with a unique identifier such as the Mobile Identification Number (MIN) associated with the wireless access device 2, which MIN is provided automatically during speech call 184.

Also as illustrated in FIG. 5, a telephone call to the destination can be automatically initiated by selecting the appropriate link 190 from the information page provided by WAP server 10. In this way, the user retrieves the data in whatever format is most convenient, including spoken instructions, text instructions, and the option of calling the destination directly.

The foregoing disclosure and description of preferred embodiments of the invention are illustrative and explanatory thereof and various changes in the components, connections and contacts, as well as the details of the illustrated circuitry, construction and method of operation may be made without departing from the spirit of the invention which is described with particularity in the claims appended hereto. For instance, several of the described components are illustrated as software code running on general purpose computers. Alternatively, these components could be realized as hard-wired specialized purpose computers, or as firmware pre-programmed into the hardware. Various modifications, and variations on the described embodiments will be apparent to one skilled in the art and are contemplated within the inventive concept as well.

We claim:

1. A method of providing voice activated locator services to a user using a wireless access device, comprising:

accepting a voice connection between the wireless access device and a speech serves;

initiating a call flow in which voice prompts are provided to the user and the user's spoken responses are received;

converting the user's spoken responses into database query commands;

forwarding the database query commands to a locator service, along with starting location information;

receiving destination information from the locator service;

converting the destination information into a voice prompt and presenting same to the user over the voice connection;

converting the destination information into a graphical representation and presenting the same to the user over a data connection between the wireless access device and a WAP server;

providing a starting location voice prompt to the user requesting starting location information;

receiving a spoken shortcut phrase from the user in response to the starting location voice prompt;

converting the spoken shortcut phrase to a text phrase;

comparing the converted text phrase to a plurality of pre-stored test phrases;

identifying a pre-stored text phrase matching the converted text phrase; and forwarding the street address associated with the identified pre-stored test phrase as the starting location information.

2. The method of claim 1 wherein the graphical representation is text.

3. The method of claim 1 wherein the destination information includes driving directions.

4. The method of claim 1 wherein the destination information is stored to a database along with a unique identifier.

5. The method of claim 4 wherein the unique identifier is the Mobile Identification Number of the wireless access device.

6. The method of claim 1 wherein the location information for the wireless access device is obtained by cellular site triangulation.

7. The method of claim 1 wherein the user's spoken responses are in the form of a type and a subtype for a desired destination.

8. The method of claim 1 wherein the starting location information is geo-coded information for the actual location of the wireless access device.

9. The method of claim 1 wherein the database query commands are forwarded over a computer network.

10. The method of claim 1 further comprising the step of a user placing a voice call between the wireless access device and the speech server, using the wireless access device.

* * * * *